United States Patent
Ji et al.

(10) Patent No.: US 10,162,245 B2
(45) Date of Patent: Dec. 25, 2018

(54) DISTRIBUTED ACOUSTIC SENSING SYSTEM BASED ON DELAYED OPTICAL HYBRID PHASE DEMODULATOR

(71) Applicant: NEC Laboratories America, Inc., Princeton, NJ (US)

(72) Inventors: Philip Nan Ji, Cranbury, NJ (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/596,043

(22) Filed: May 16, 2017

(65) Prior Publication Data

US 2017/0350734 A1    Dec. 7, 2017

Related U.S. Application Data

(60) Provisional application No. 62/344,597, filed on Jun. 2, 2016.

(51) Int. Cl.
*G02F 1/335* (2006.01)
*G01D 5/353* (2006.01)
*G02F 1/125* (2006.01)

(52) U.S. Cl.
CPC ......... *G02F 1/335* (2013.01); *G01D 5/35306* (2013.01); *G01D 5/35358* (2013.01); *G02F 1/125* (2013.01)

(58) Field of Classification Search
CPC .................. G01D 5/35358; G01D 5/35361
See application file for complete search history.

(56) References Cited

U.S. PATENT DOCUMENTS

| | | | | |
|---|---|---|---|---|
| 8,725,006 B2* | 5/2014 | Huang | ............... | H04B 10/616 |
| | | | | 398/204 |
| 2010/0098252 A1* | 4/2010 | Kanter | ............... | H04L 9/0852 |
| | | | | 380/256 |
| 2018/0087372 A1* | 3/2018 | Stokely | ............... | G06T 5/001 |

FOREIGN PATENT DOCUMENTS

| | | |
|---|---|---|
| WO | WO 2008/110780 | 9/2008 |
| WO | WO 2010/136810 A2 | 12/2010 |
| WO | WO 2012/030814 A2 | 3/2012 |

OTHER PUBLICATIONS

J. He et al., "An ameliorated phase generated carrier demodulation algorithm with low harmonic distortion and high stability" Journal of Lightwave Technologies 28(22):3258-3265 (2010).

(Continued)

*Primary Examiner* — Shawn Decenzo
(74) *Attorney, Agent, or Firm* — Joseph Kolodka

(57) ABSTRACT

A sensing system adapted to receive backscattered signal from a sensing fiber includes a first Faraday rotator mirror; a second Faraday rotator mirror; an optical hybrid coupled to the Faraday rotator mirrors, wherein one of the mirrors is coupled with an optical path difference; a 3-port optical circulator coupled to the sensing fiber and the optical hybrid; a first photodetector coupled to the circulator; and three photodetectors coupled to the optical hybrid.

20 Claims, 11 Drawing Sheets

(56) References Cited

OTHER PUBLICATIONS

D.A. Jackson, "Elimination of drift in a single-mode optical fiber interferometer using a piezoelectrically stretched coiled fiber" Applied Optics 19(17):2926-2929 (1980).
S.K. Sheem et al., "Optical techniques to solve the signal fading problem in fiber interferometers" Applied Optics 21 (4):689-693 (1982).
M.D. Todd et al., "Improved, operationally-passive interferometric demodulation method using 3x3 coupler" Electronics Letters 38(15):784-786 (2002).

* cited by examiner

# DISTRIBUTED ACOUSTIC SENSING SYSTEM BASED ON DELAYED OPTICAL HYBRID PHASE DEMODULATOR

BACKGROUND

The present invention relates to distributed acoustic sensing systems.

Fiber optic sensors use optical fiber either as the sensing element or as a means of relaying optical signals from optical sensing element(s) to the signal processor. There are also sensors that use optical fibers as the signal transmission media. Here we are not referring to this type of sensors.

Fiber optic sensors can detect various phenomena, such as temperature, strain, pressure, vibration, acceleration, chemical, among others They offer many advantages compared to other types of sensors (such as mechanical sensors, electrical sensors, or even free space optical sensors), including: high sensitivity, immune to electromagnetic interference, long sensing length, remote interrogation capability, not requiring line-of-sight, compact, lightweight, mechanically flexible, low signal latency, high system stability, high fatigue durability, ability to stand ultra-harsh environment, among others. Therefore, fiber optic sensors have wide range of applications.

In terms of the number and location of sensing points, fiber optic sensors can be classified into single point sensor (where there is only one sensing element placed at the end or the middle of the fiber), multi-point sensor (also called quasi-distributed sensor, where there are multiple sensing elements placed along the fiber), and distributed sensor (where the fiber itself serves as the continuous sensing element). This invention mainly targets distributed fiber sensors.

There are various types of distributed fiber sensors, based on the physical phenomena used for sensing, and the physical parameters that they measure. For example, distributed temperature sensors (DTS) mainly refer to distributed fiber sensors that use Raman backscattering to measure the temperature along the fiber; distributed strain and temperature sensors (DSTS) mainly refer to distributed fiber sensors that use Brillouin backscattering to measure the temperature and strain along the fiber; distributed acoustic sensors (DAS) mainly refer to distributed fiber sensors that use Rayleigh backscattering to measure the acoustic signal along the fiber, among others.

In a DAS system, when light is transmitted through the fiber, light is elastically scattered by particles (inhomogeneities) much smaller than the wavelength of the radiation. This is called Rayleigh scattering. The scattered light has the same frequency as the transmitted light. In DAS, a coherent laser pulse is sent along an optic fiber. By the elastic Rayleigh scattering, a small amount of the optical signal is backscattered from every position along the fiber. The intensity of the scattered light is measured as a function of time with respect to the initial pulse injection time. When the pulse has travelled the full length of the fiber and back, the next laser pulse can be sent along. If an ambient acoustic wave field or vibration field is present, there is a dynamic strain changes at the location of the fiber, which changes the relative position of the scattering centers/inhomogeneities, as well as the length of the fiber at the affected section. This leads to the change in the phase of the backscattered signal. Due to the high pulse rate and the high speed of light propagation within the fiber, the temporal variation of the amplitude, frequency, and phase information of the scattered signal can be obtained continuously through direct measurement or processing. The phase information in turn provides the acoustic wave or vibration information. Due to different arrival time of the backscattered signal at different locations along the fiber, the acoustic information at each location of the fiber can be differentiated. Since the phase information is used in DAS to obtain the acoustic signal, and time domain information is used to determine the location, therefore the DAS is sometimes also called "phase sensitive optical time domain reflectometer" (PS-OTDR or $\Phi$-OTDR).

DAS is a sensitive system that can detect small acoustic signal at high spatial resolution along long distance of fiber, therefore it has many applications, ranging from underground oil/gas exploration, oil/gas production monitoring, intrusion detection, seismic monitoring, infrastructure health monitoring, among others In DAS, the sensing element is the optical fiber. Typically, single mode fiber is used. However multi-mode fiber can also be used.

FIG. 1 shows the basic schematic of a DAS system. The main element is called the interrogator (101), which is connected to the sensing fiber (102), and external computer/server (103) for data output, display, storage, further analysis, transportation, among others. All the essential optical and optoelectronic components are located within the interrogator. The main elements include a pulse laser source (104); a circulator (105) to direct the light pulse into the sensing fiber and direct the backscattered light to the demodulator; and a phase demodulator (106) to extract phase information from the backscattered optical signal.

The phase demodulator (106) commonly consists of an interferometric optics section (107) for interference between the signal light and a reference light; one or more photodetectors (108 and 109) to convert the optical output(s) from the interferometer to electrical signal; analog-to-digital converters (ADC) (110) to digitize the signals; and digital processor (111) to process the signal using the demodulation Control and calculate the phase and acoustic information.

FIG. 2 is an extended schematic of the DAS interrogator. Here, the light source is a continuous wave laser (201). The output is modulated to produce a pulse signal by a modulator (202), which is driven by a modulator driver (203). The generated pulse signal is amplified optically by an optical amplifier (204). An optical filter (205) is used to remove out-of-band amplified spontaneous emission (ASE) noise from the amplifier. The backscattered light from the sensing fiber is also amplified by another optical amplifier (206), and another optical filter (207) is used to filter out the out-of-band ASE noise. The modulation signal for the modulator driver (203) is linked to the data processor (111) to synchronize the timing. Typically the processor generates the signal in digital format, which is converted to an analog signal by a digital-to-analog converter (DAC) (208) to be sent to the modulator driver.

Not all the additional components in FIG. 2 are needed. For example, some DAS interrogators do not require both amplification stages. The DAC for the modulator driver might not be necessary either.

High sensitivity is needed for the sensor. To achieve high sensitivity, the noises need to be reduced and mitigated to minimum. The noise sources in a DAS system include the phase noise and relative intensity noise (RIN) from the laser source, detector noise, shot noise, amplifier noise, digital quantization noise, among others Therefore it is important to use high quality components (laser, detector, amplifier, among others) with high stability and low noise.

Another important aspect of achieving high sensitivity is through the phase demodulator design. Conventional interferometric sensors use basic interferometers such as Mach-Zehnder interferometer (MZI) and Michelson interferometer (MI) as the interferometric optics (such as [1], which uses MI). However these sensors are sensitive to environmental perturbations which cause signal fading [2]. In this invention, the main problem to solve is how to design the phase demodulator, in particular the interferometric optics and the associated demodulation Control, to improve the sensing system sensitivity.

Various existing methods and interferometer designs to over the environmental perturbation sensitivity and signal fading issue in the interferometric sensors such as DAS. One method is to add active phase control, such as using a servo driven piezo-electrically stretched coil fiber. However this method is bulky and heavy, and might remove useful signal if the frequencies are similar to the interfering noise frequencies. Therefore it is not suitable for actual field deployment. Another widely used method is called the phase generated carrier (PGC) method. In such scheme, a high frequency sinusoidal phase modulation is applied to one of the arms of the interferometer to generate a phase carrier, which up-converts the desired phase shift signal onto the sidebands of the carrier frequency. By detecting one odd harmonic and one even harmonic of the PGC interference signal, a pair of quadrature components containing the phase-shift are then acquired, with which the bias-induced fading can be overcome. The interferometer can be MZI or MI, which are represented in FIGS. 3A-3B respectively. There are mainly two phase demodulation Controls associated with PGC. The first is called the differential-and-cross-multiplying control (PGC-DCM), and the other is called the arctangent control (PGC-ATAN). However, both of them have key weaknesses. The output of PGC-DCM is affected by the fluctuation of the light intensity, the visibility of the interferometer, and the modulation depth of the interferometer. Even if normalization based on automatic gain control is used to stabilize the demodulation, the influence of light intensity disturbance cannot be eliminated completely. As for the PGC-ATAN, even though it is insensitive to light intensity disturbance, the modulation depth affects its stability. It has strict requirement for modulation depth. A small deviation may introduce significant nonlinearity, resulting in serious harmonic distortion. There were other approaches to reduce these effects, such as the ameliorated PGC control. However, they require complex computation processing, therefore is difficult for real-time implementation. Furthermore, the PGC-based phase demodulator requires highly symmetric electronic and carrier frequency stability. It has low dynamic range. And it requires active electronics in the interferometric optics, which leads to power consumption issue, interference issue, heat dissipation issue, control issue, among others. Comparing between the MZI with PGC and MI with PGC, the MZI with PGC has the issue of sensitivity to signal polarization. The MI with PGC can eliminate this problem by using Faraday rotator mirror (FMR) as the two reflective mirrors.

Another popular approach is to use 3×3 coupler (such as in [5]). Conventional/basic interferometers use 2×2 couplers to convert phase encoded signal into intensity modulations. However with 2×2 couplers, there are certain phases (0, 180☐, among others) where the change of output with respect to phase is 0. By using 3×3 coupler, the phase difference between any of the three outputs is 120 deg. The associated demodulation control can be used to recover the phase information.

FIG. 4A shows one example of interferometric optic in the 3×3 coupler-based phase demodulator. FRMs are used to eliminate the polarization issue. Depending on which phase information is needed, the optical path difference might not be required. And the circulator can be replaced with a 2×2 coupler. The 3×3 coupler configuration can also be extended to 4×4 coupler configuration (FIG. 4B). Compared with the PGC approaches, this technique does not require active phase carrier, therefore the interferometric optics element is completely passive. It does not require expensive laser diodes with long coherence lengths. It has better stability, and larger dynamic range. However, it also has its weaknesses. In the 3×3 coupler approach, it requires that the 3×3 coupler has ideal splitting ratio, which produces 120 deg. phase difference. However this is difficult to be realized. Theoretical analysis and experiments show that if the phase difference deviates from 120 deg., the signal will be distorted.

In all the techniques described above, the phase information is obtained through the interference between the signal for the current fiber section and the neighboring fiber section (in other words, it's the interference between the backscattered signal at one time period with the signal at the previous period), or the signal with itself.

Other system calculates phase information through interference between the signal and the source laser. It is called coherent OTDR or C-OTDR. FIG. 5A shows one configuration of the interferometric optics in C-OTDR. It has two inputs, the first is the backscattered signal from the sensing fiber (same as all the techniques above), and the second one is tapped from the source laser in the interrogator, which serves as the local oscillator (LO). The main device in the interferometric optic is a 90 deg. optical hybrid, which is a passive broadband device that accepts the two optical signals (signal and LO, represented as S and L here) and generates four output signals: S+L, S−L, S+jL, S−jL. This is a common device used for coherent receiver in optical communications, where the phase information of the received transmission data can be obtained through processing the four output signals. Here the optical hybrid is used to obtain the phase information of the backscattered sensing signal. Since the signal and the LO come from the same laser source, this type of coherent detection is referred to as the homodyne detection.

FIG. 5B shows another configuration of the interferometric optics in C-OTDR. Its main device is a 3×3 coupler. Two of the inputs are the backscattered signal and the local oscillator tapped from the source laser respectively, the third input is not used. The three outputs are detected and processed to extract the phase information. There are several disadvantages with the C-OTDR-based phase demodulator. The first issue is the laser frequency drift. The backscattered light travels through a long distance (down and back from the sensing fiber) before entering the optical hybrid or coupler. By the time the interference occurs, the source laser wavelength/frequency is likely to have drifted to a certain degree, and the phase also drifts. Therefore, the LO cannot provide a stable reference phase. There is no such problem in the previous methods since there is very short time elapsed between the two signals to be interfered.

Also, it is desirable for the two input signals (backscattered light and local oscillator) to have similar optical power levels. However, since the Rayleigh backscattered light is very weak (such as 10-4 of the input signal), even if we only tap out a small percentage of source laser output as the LO (such as using 99:1 splitter to get 1% of light, which is typically the lowest from the commercially available optical tap splitters), the LO is still much stronger than the backscattered signal. Being polarization-sensitive is also an issue with C-OTDR. And it is not practical to solve it by using polarization maintaining fiber, since the sensing fiber is usually very long (such as kilometers) and therefore it is costly to replace standard fiber with polarization maintaining fiber.

SUMMARY

In one aspect, a phase demodulator includes the interferometer design and the respective demodulation control. These two elements enable a phase demodulator to eliminate the weaknesses of other systems.

In another aspect, a sensing system adapted to receive backscattered signal from a sensing fiber includes a first Faraday rotator mirror; a second Faraday rotator mirror; an optical hybrid coupled to the Faraday rotator mirrors, wherein one of the mirrors is coupled with an optical path difference; a 3-port optical circulator coupled to the sensing fiber and the optical hybrid; a first photodetector coupled to the circulator; and three photodetectors coupled to the optical hybrid.

Advantages of the system may include one or more of the following. The instant phase demodulator overcomes the disadvantages of the existing solutions, such as polarization sensitivity, limited dynamic range, electronic symmetry requirement, frequency stability requirement, splitter ratio inequality, large optical power difference, laser phase instability, signal fading, strict modulation depth requirement, high computation complexity, among others, therefore offers better stability and sensitivity. Also, since its interferometric optics is totally passive (does not require active phase control or carrier modulation), it is more compact, low cost, and stable. Therefore, by using this phase demodulator, the DAS and other fiber optic sensors can achieve better sensing performance with lower cost and real-time operation.

BRIEF DESCRIPTION OF THE DRAWINGS

FIG. 3A shows a conventional interferometer using MZI with PGC, while

FIG. S 4A-4B show various conventional interferometric optics in the (a) 3×3 and (b) 4×4 coupler-based phase demodulator, respectively.

Figure 1:
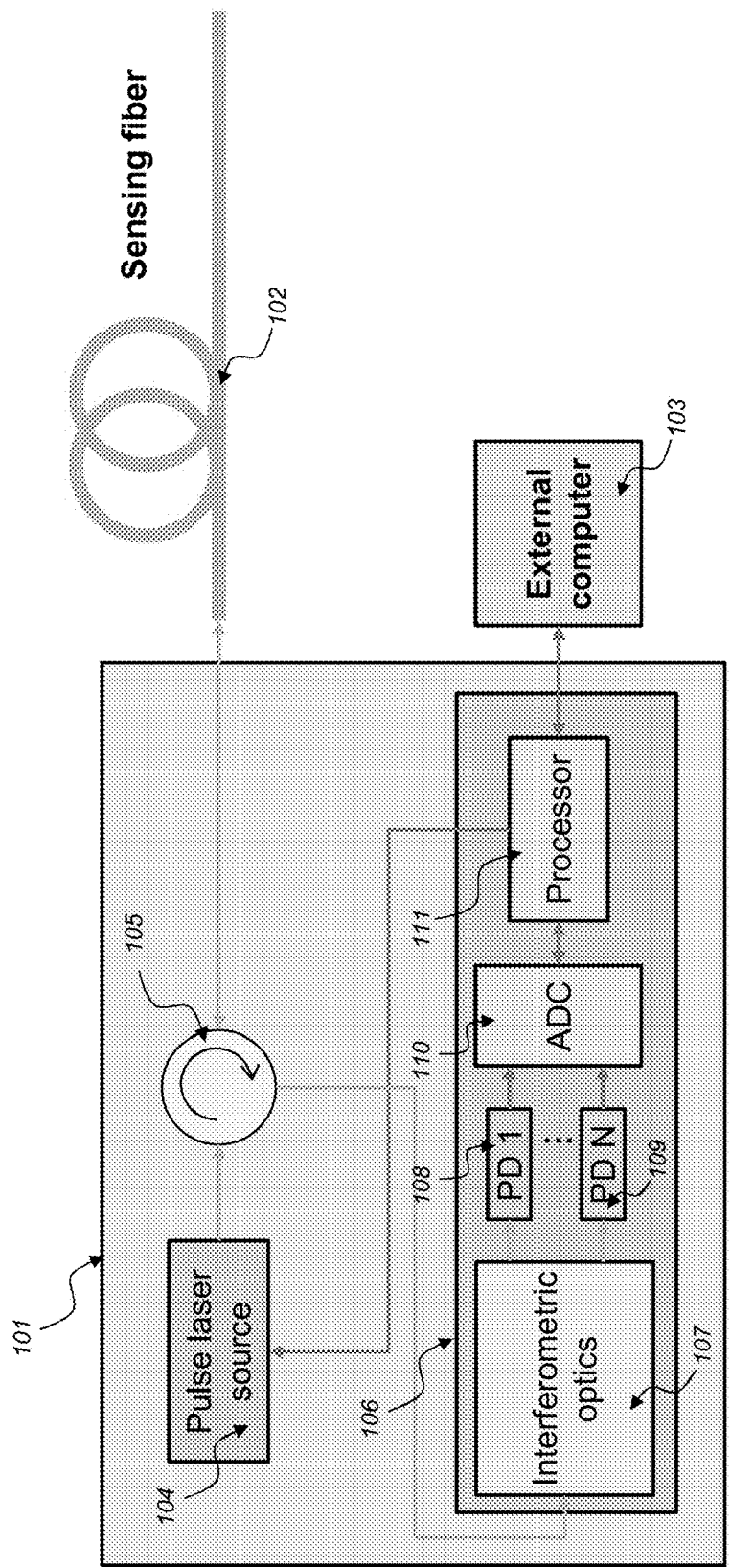
FIG. 1 shows an exemplary schematic of a DAS system.
Figure 2:
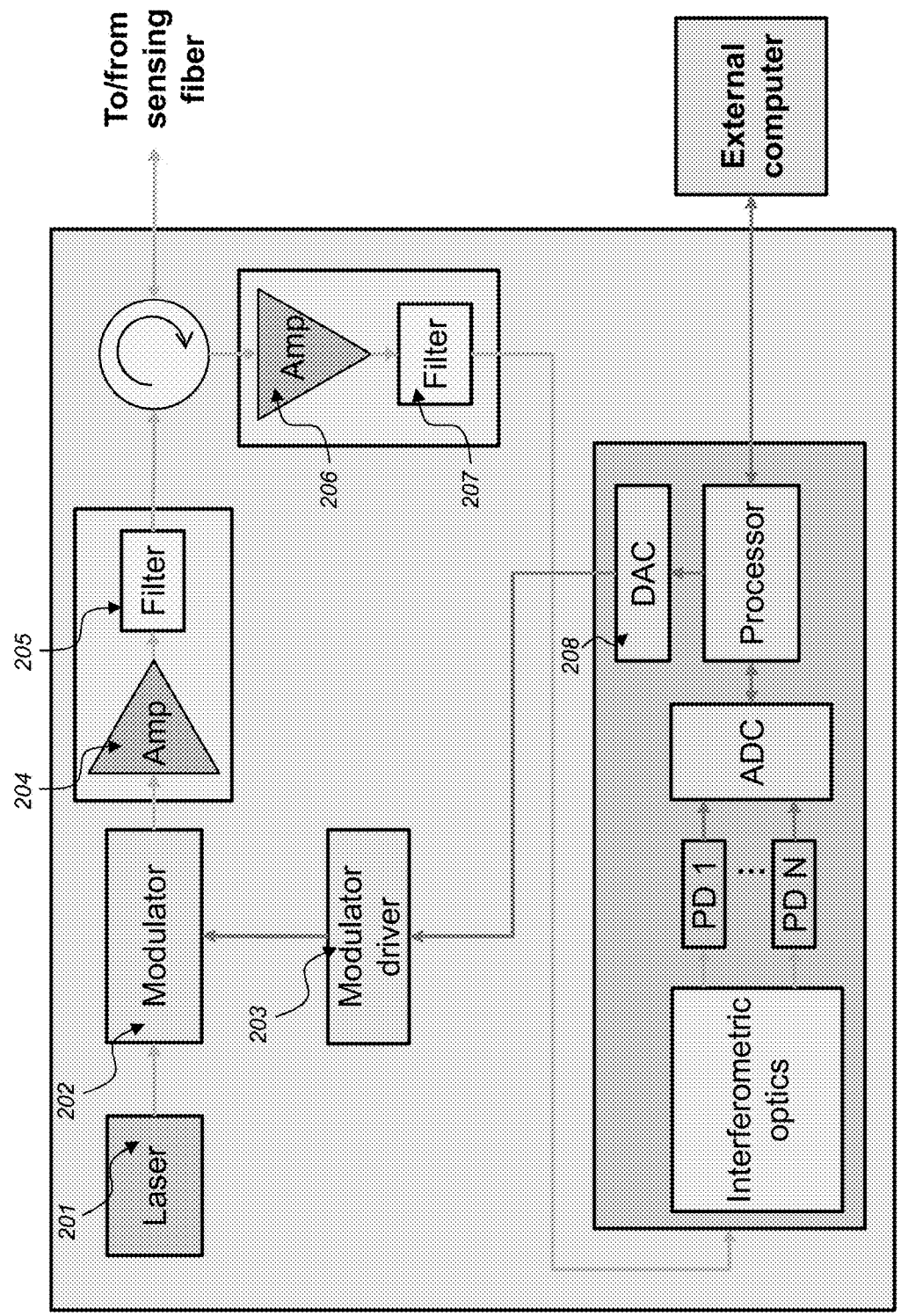
FIG. 2 shows a conventional extended DAS system.
Figure 3A:
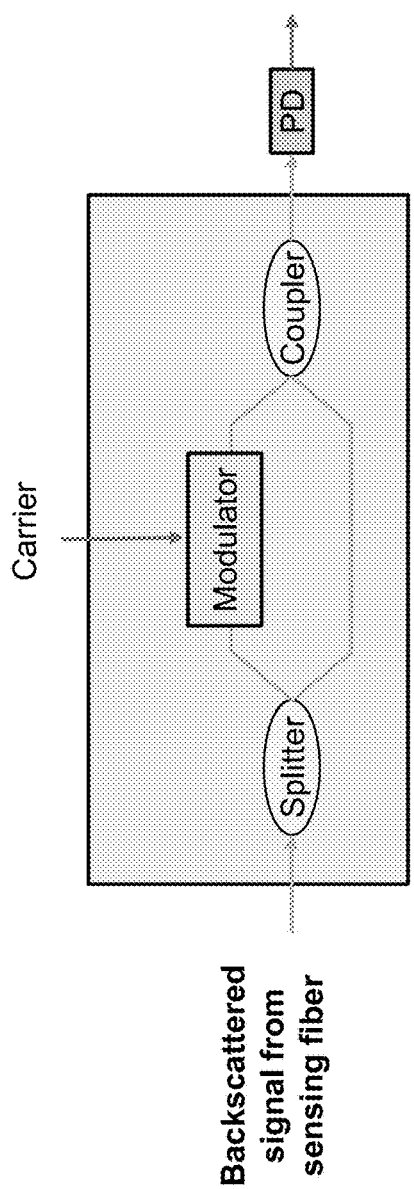
Figure 3B:
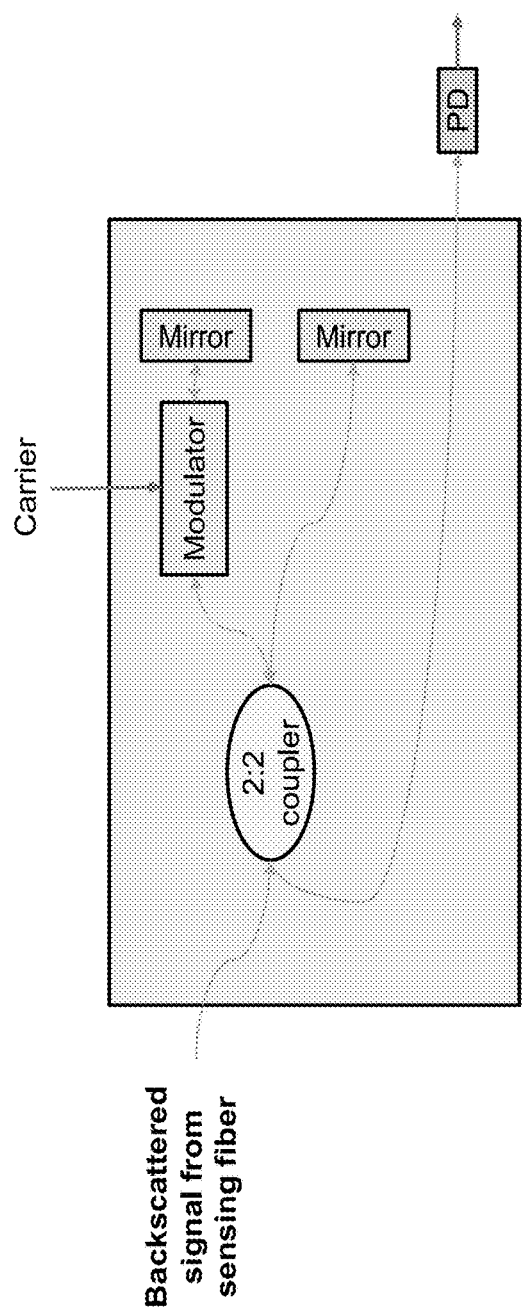
FIG. 3B shows an interferometer using MI with PGC.
Figure 4A:
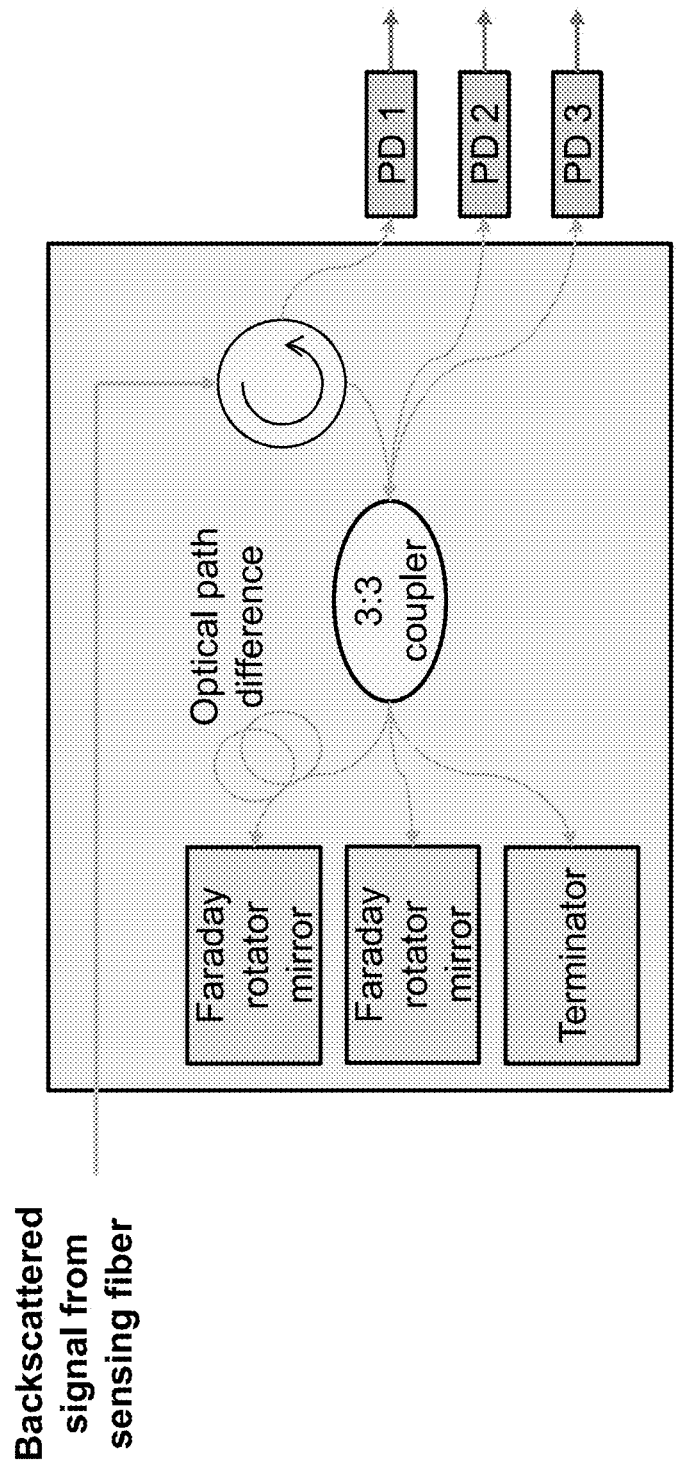
Figure 4B:
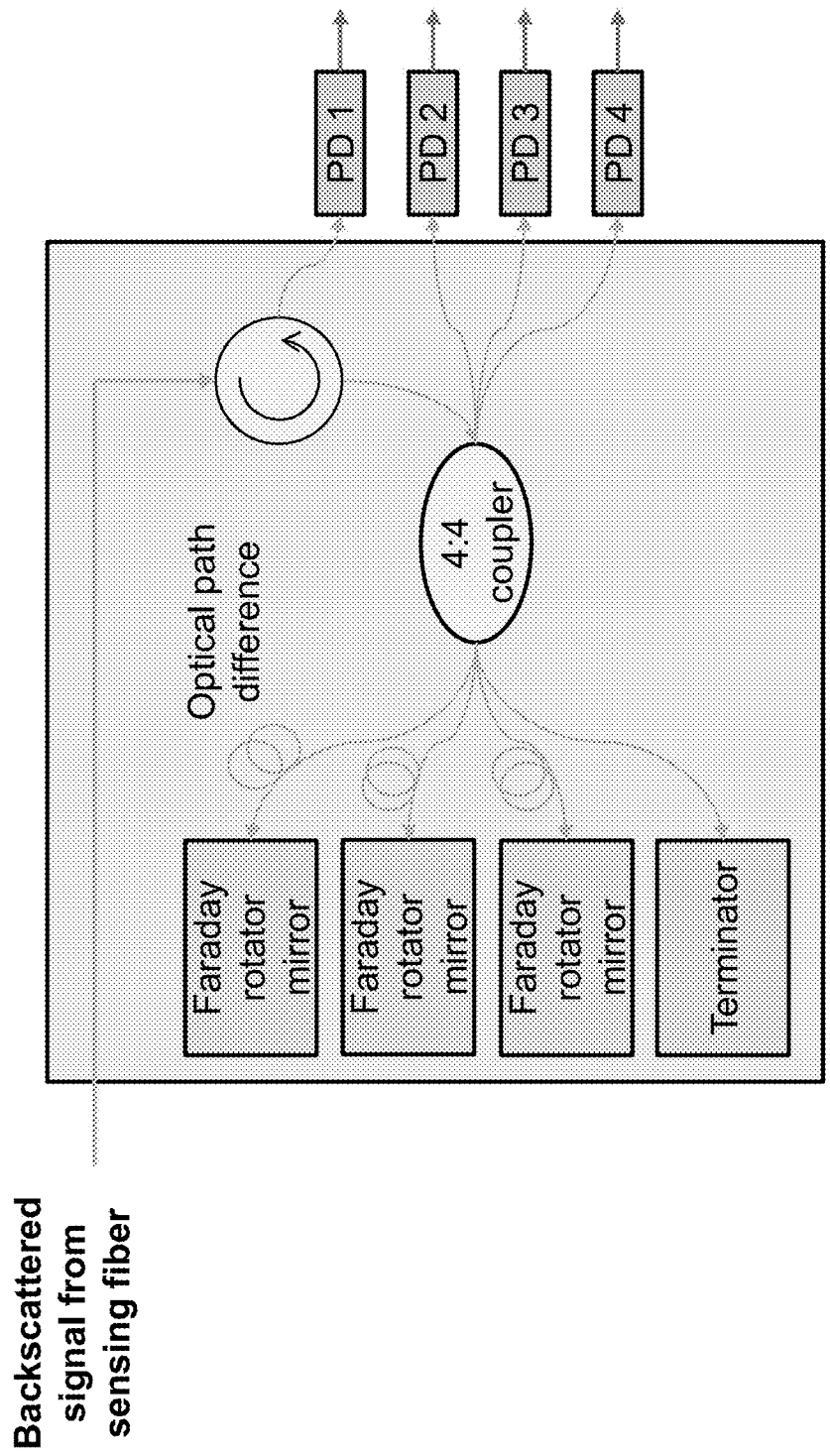
Figure 5A:
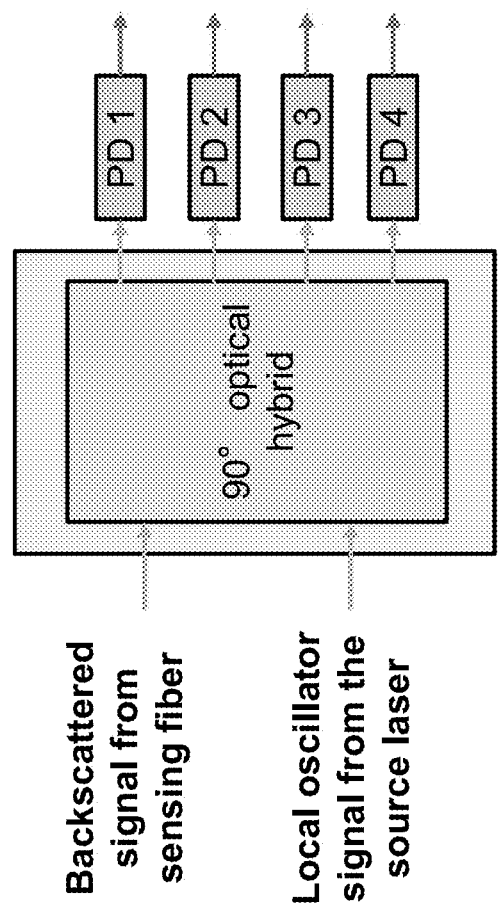
Figure 5B:
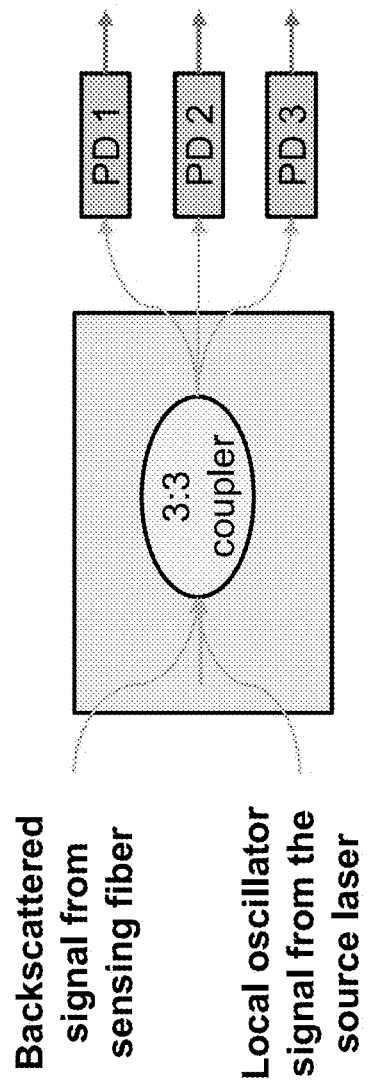

FIGS. 5A-5B show conventional interferometric optics in Coherent OTDR-based phase demodulator using 90-degree optical hybrid and using 3×3 coupler, respectively.

Figure 6:
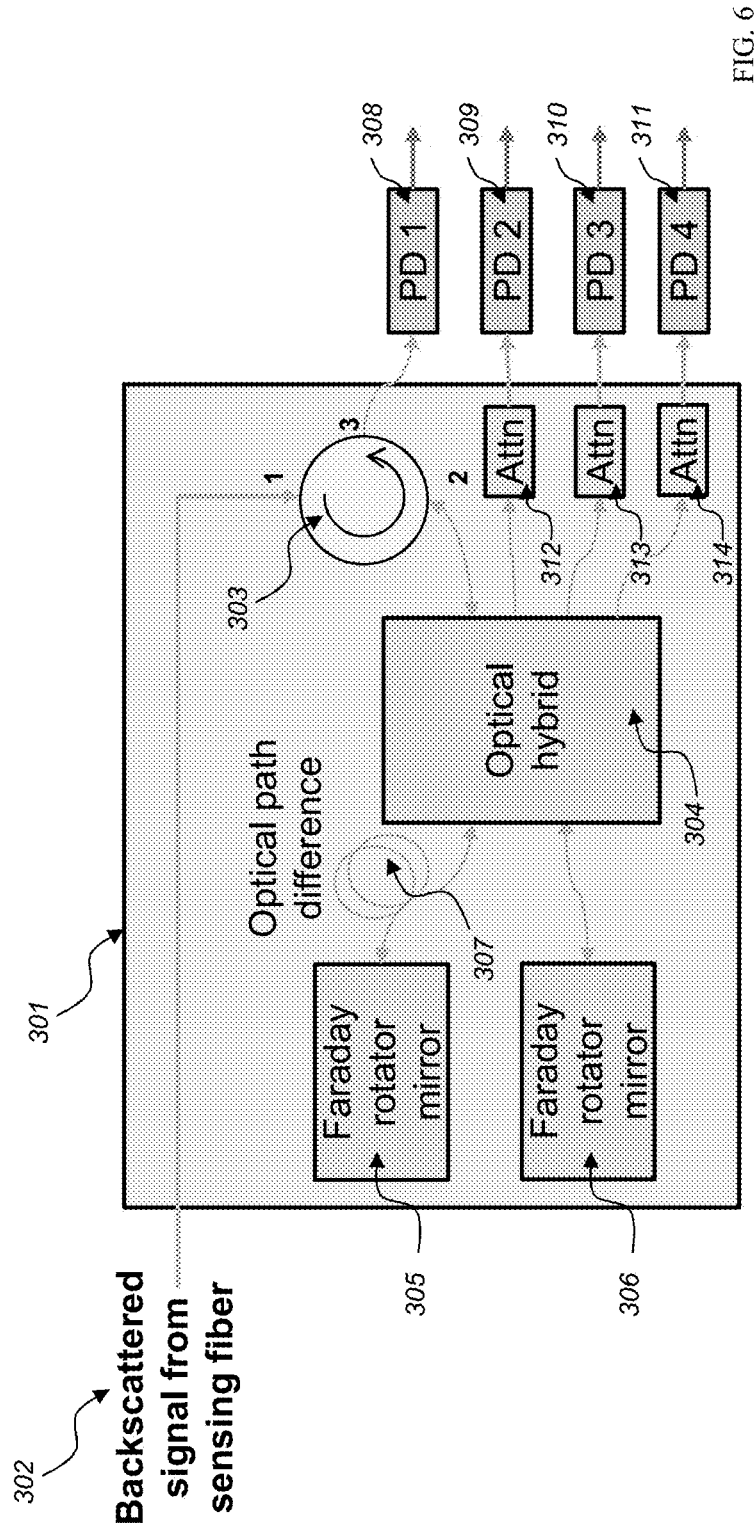
Figure 7:
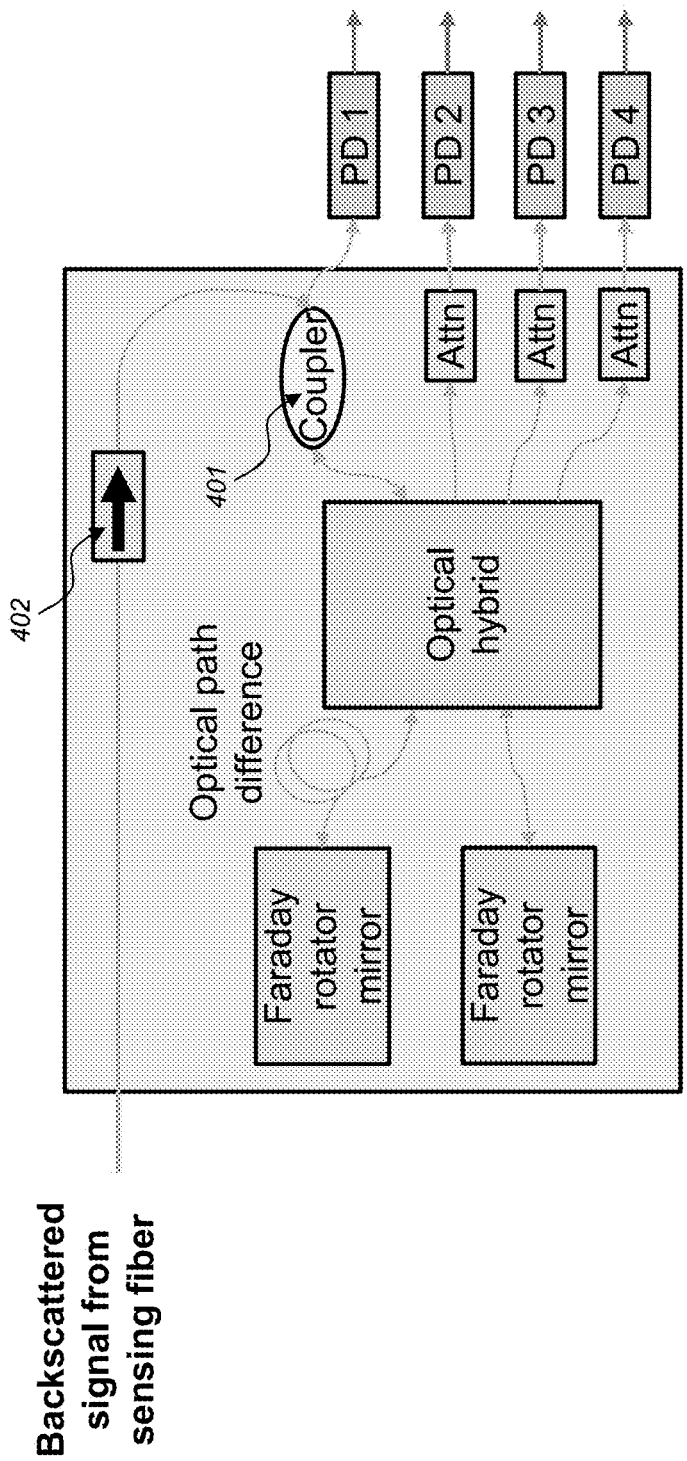
Figure 8:
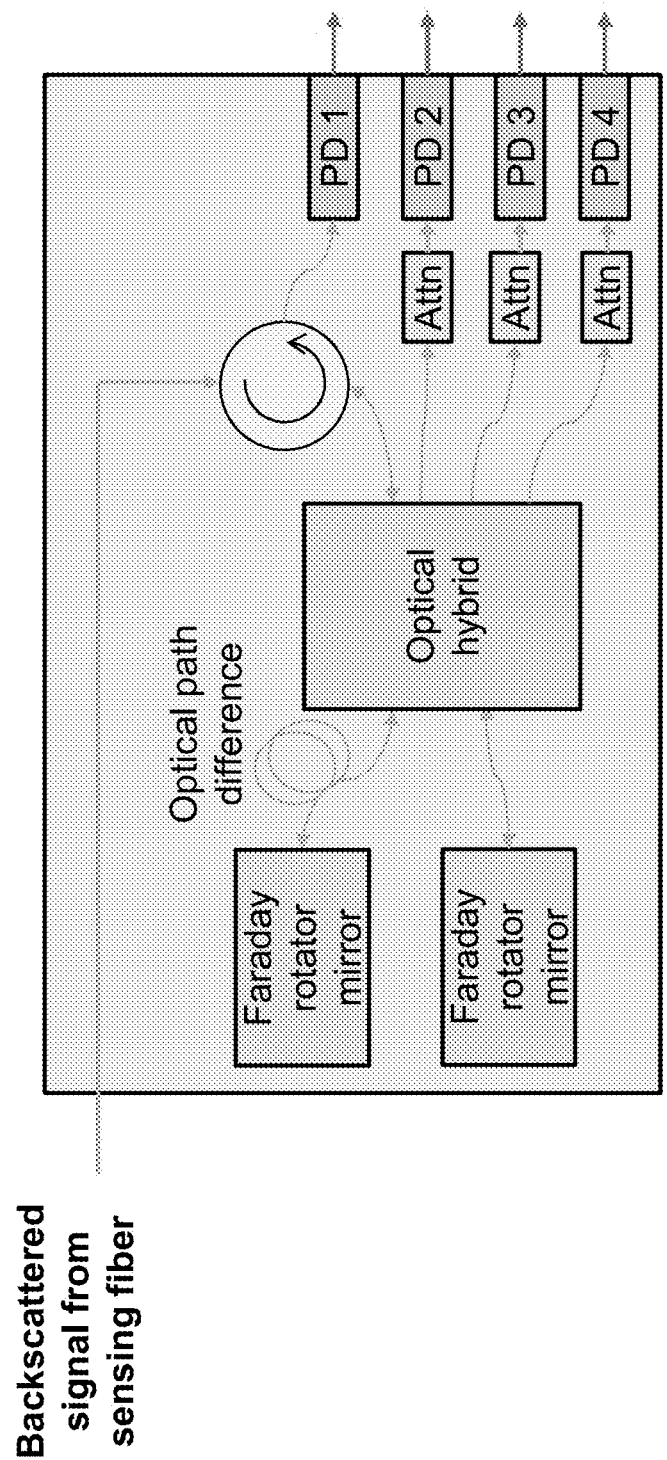
Figure 9:
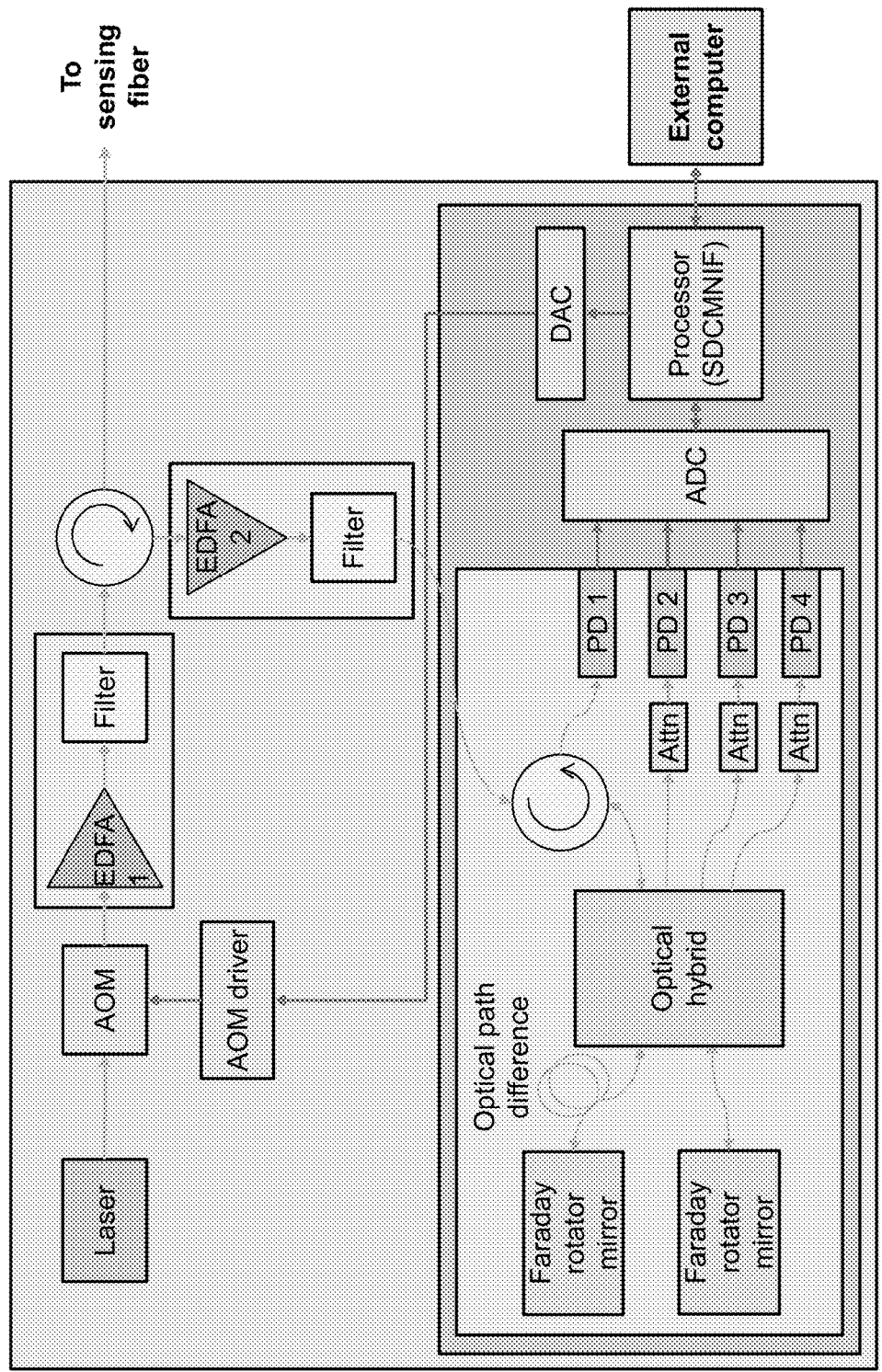

FIG. 6 shows an exemplary interferometric optics in the delay hybrid-based phase demodulator FIG. 7 shows an exemplary alternative design without optical circulator FIG. 8 shows an exemplary alternative design with integrated photodetectors FIG. 9 shows an exemplary DAS interrogator with delay hybrid-based phase demodulator.

Figure 10:
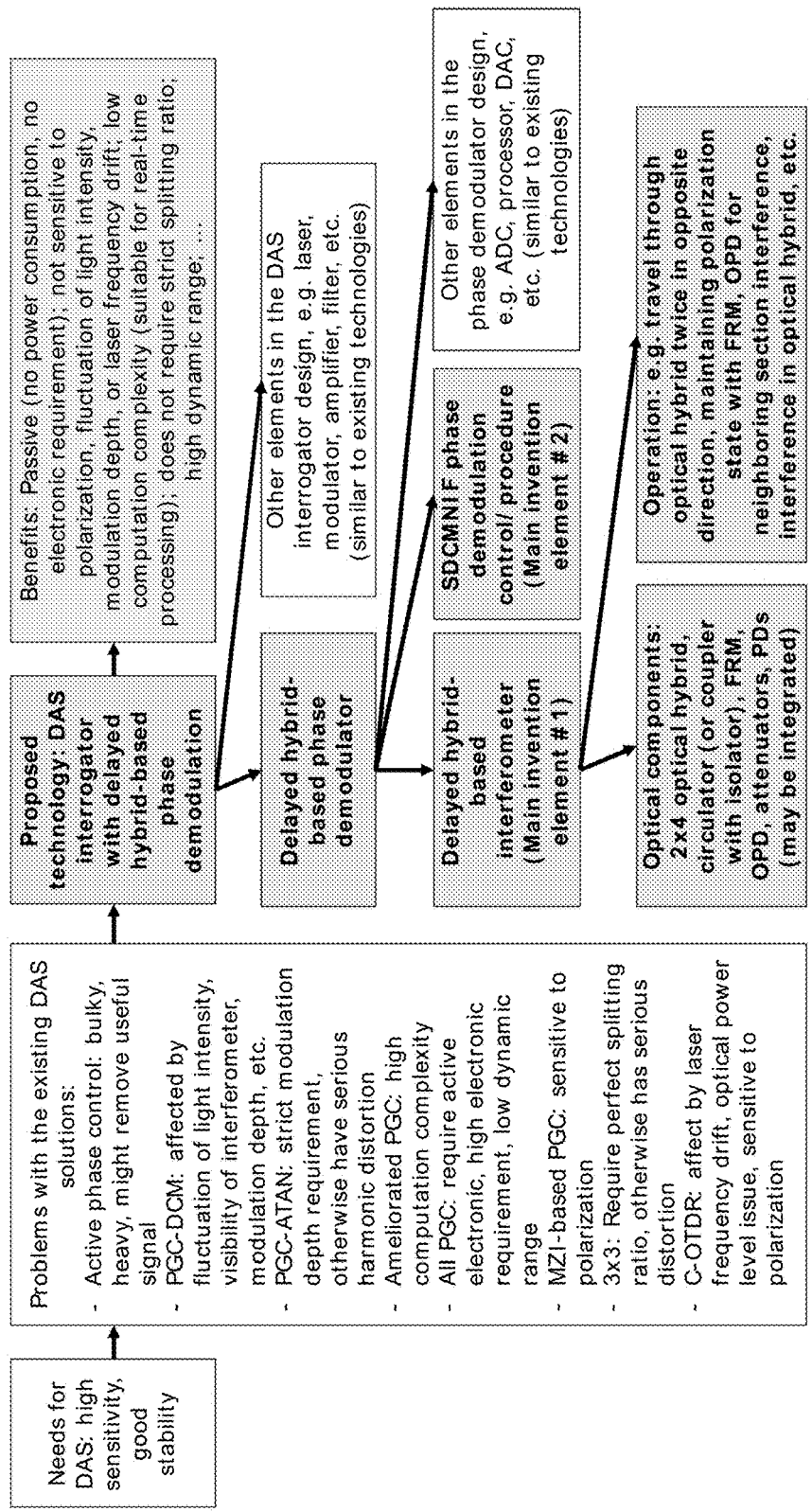

FIG. 10 shows an exemplary process for providing DAS sensing.

DESCRIPTION

FIGS. 6-9 show exemplary phase demodulators for DAS and other distributed fiber optic sensors. The two significant elements in these systems are the interferometric optics design and the associated demodulation control.

FIG. 6 shows an exemplary interferometric optics design is called "delayed hybrid" (301). The basic schematic is shown in FIG. 6. It has one input and four outputs. The input is the backscattered signal from the sensing fiber (302). It is sent to the Port 1 of a 3-port optical circulator (303), and exits from Port 2. It then enters a 2×4 optical hybrid (304) through one of the 4 "output ports". (In the proposed method, the light passes through the optical hybrid twice, in opposite directions, therefore strictly speaking there is no pure "input port" or "output port". However, in accordance with conventional notations, the side with two fiber ports is referred to as the "input ports", and the side with four fiber ports as the "output ports").

The light travels through the optical hybrid in the opposite direction of a regular 2×4 optical hybrid (from the "output end" to the "input end"), and exits the two "input ports" of the hybrid. They are sent to their respective Faraday rotator mirror (305 and 306), and back to the optical hybrid (304). The FRMs ensure that the polarization states of the two beams are maintained when they reenter the optical hybrids. There is an optical path difference (OPD) (307) between the two paths, so that the backscattered light at one section of the fiber interferes with the subsequent section to obtain the phase difference between them. The OPD is essentially a section of fiber, with the length equals to half of the distance between the two fiber sections, since the light travel through it twice.

These two light beams then travel through the optical hybrid in the same direction as regular 2×4 optical hybrid (from the "input end" to the "output end"), and exits the four "output ports" of the hybrid. One of the ports is connected to the circulator (303), where the light enters Port 2 and exits Port 3 to go to the photodetector (308). The lights exiting the other three ports go to another three photodetectors (309-311). Since the first output experiences more loss due to the circulator, the lights are the other three outputs are attenuated by optical attenuators (312-314) to maintain signal level balance. The outputs from the four photodetectors (308-311) are then digitized by ADCs (110) and processed by the processor (111).

Since all the key components, such optical hybrid, FRMs, circulator, optical attenuators, are mature technology and have been commercially available for long time and widely deployed in the field, there is no problem with their availability and quality. Since the interferometric optics is completely passive, there is no issue with electronic stability, symmetry, noise, control, or power consumption. The interferometric optics can be realized in fiber-based technology or free-space technology or a mix of both.

There are various design alternatives or modifications that can be done. For example, the attenuation can be done inside the optical hybrid. Or the optical attenuators can be removed, and use digital processing to take care of the power difference.

As shown in FIG. 7, the circulator (303) can be replaced with a 2×1 coupler (401) or a 2×2 coupler with one port unused, an optical isolator (402) is used to prevent light from traveling back to the input port.

Also, the photodetectors can be integrated with the interferometric optics to build a monolithic device, as shown in FIG. 8.

Next, a phased demodulation control for delayed hybrid-based phase demodulator is discussed. Based on the interferometric optics design described above, the four photodetectors will produce four outputs:

$$I_1 = A + B \cos[\phi(t)] \qquad (1)$$

$$I_2 = A + B \sin[\phi(t)] \quad (2)$$

$$I_3 = A - B \cos[\phi(t)] \quad (3)$$

$$I_4 = A - B \sin[\phi(t)] \quad (4)$$

where A and B are constants determined by the interferometric system design, and $\phi(t)$ is the phase difference between the two interfered sections at time t. The sections to be interfered are related to the pre-set OPD length, as well as the pulse width and the propagation speed of light inside the fiber. The target is to obtain the time-varying phase information $\phi(t)$ from the four photodetector outputs.

A straightforward way is to obtain the difference between a pair of two outputs, get the ratio, and perform arctangent function, such as:

$$X(t) = I_1 - I_3 = 2B \cos[\phi(t)] \quad (5)$$

$$Y(t) = I_2 - I_4 = 2B \sin[\phi(t)] \quad (6)$$

$$Z(t) = Y(t)/X(t) = \tan[\phi(t)] \quad (7)$$

$$\phi(t) = \arctan[Z(t)] \quad (8)$$

However, this method has phase ambiguity problem due to the arctangent function. The phase demodulation method/procedure uses subtraction, differentiation, cross multiplication, normalization, integration, and filter steps to recover the phase information accurately. This process is called the SDCMNIF procedure.

After obtaining the difference values through subtracting two output pairs (equations (5) and (6) above), the derivatives are calculated:

$$X'(t) = -2B \sin[\phi(t)] \cdot \phi'(t) \quad (9)$$

$$Y'(t) = 2B \cos[\phi(t)] \cdot \phi'(t) \quad (10)$$

Then the cross multiplication is performed:

$$Y'(t) \cdot X(t) - X'(t) \cdot Y(t) = 4B^2 \cos^2[\phi(t)] \cdot \phi'(t) + 4B^2 \sin^2[\phi(t)] \cdot \phi'(t) = 4B^2 \phi'(t) \quad (11)$$

Also, the average power can be calculated as:

$$X^2(t) + Y^2(t) = 4B^2 \cos^2[\phi(t)] + 4B^2 \sin^2[\phi(t)] = 4B^2 \quad (12)$$

Therefore equation (11) can be normalized into:

$$[Y'(t) \cdot X(t) + X'(t) \cdot Y(t)]/[X^2(t) + Y^2(t)] = 4B^2 \phi'(t)/4B^2 = \phi'(t) \quad (13)$$

By taking the integration of equation (13), we can recover the signal phase as:

$$\int \{[Y'(t) \cdot X(t) + X'(t) \cdot Y(t)]/[X^2(t) + Y^2(t)]\} = \int \phi'(t) = \phi(t) + \varphi(t) \quad (14)$$

After passing through a high pass filter, the phase information $\phi(t)$ can be recovered.

Next, a DAS based on delayed hybrid phase demodulator is detailed in FIG. 9. A distributed acoustic sensor (DAS) system to receive backscattered signal from a sensing fiber includes
  a laser;
  a modulator coupled to the laser;
  an optical amplifier and filter coupled to the modulator;
  a backscattered optical amplifier and backscattered filter coupled to the modulator;
  a circulator coupled to the filter and backscattered optical amplifier and the sensing fiber; and
  a delayed hybrid phase demodulator coupled to the backscattered filter; and
  a processor coupled to the delayed hybrid phase demodulator to sense acoustic signals.

The DAS interrogator preferably works with a delay hybrid-based phase demodulator. The system can have as its delayed hybrid phase demodulator the following:
  a first Faraday rotator mirror;
  a second Faraday rotator mirror;
  an optical hybrid connected to the Faraday rotator mirrors, wherein one of the mirrors is coupled with an optical path difference;
  a 3-port optical circulator coupled to the sensing fiber and the optical hybrid;
  a first photodetector coupled to the circulator; and
  three photodetectors coupled to the optical hybrid.

The delayed hybrid phase demodulator further comprises can alternatively have the following:
  a first Faraday rotator mirror;
  a second Faraday rotator mirror;
  an optical hybrid coupled to the Faraday rotator mirrors, wherein one of the mirrors is coupled with an optical path difference;
  a 3-port optical circulator coupled to the sensing fiber and the optical hybrid;
  a first photodetector coupled to the circulator; and
  three photodetectors coupled to the optical hybrid.

A fiber loop to provide the optical path difference. Three optical attenuators respectively can be connected to each of the three photodetectors. Data converters can be connected to each photodetectors. The photodetectors generates $I_1 = A + B \cos[\phi(t)]$, $I_2 = A + B \sin[\phi(t)]$, $I_3 = A - B \cos[\phi(t)]$, and $I_4 = A - B \sin[\phi(t)]$, respectively, where A and B are constants and $\phi(t)$ is a phase difference between two interfered sections at time t. A processor obtains the time-varying phase information $\phi(t)$ from the four photodetector outputs. A data converter can digitize the acoustic phase data to the processor receiving digitized photodetector output and the output of the data converter in turn drives a modulator driver. The modulator can be an Acousto-Optic Modulator (AOM), comprising an AOM driver coupled to the AOM.

FIG. 10 shows the key features of the instant system. As shown on FIG. 10, the system is delayed hybrid-based phase demodulator, which is used in DAS interrogator. The two main elements for the invention (new and different) are (1) the delayed hybrid-based interferometer (hardware) and (2) the associated SDCMNIF phase demodulation procedure (control).

The instant phase demodulator overcomes the disadvantages of the existing solutions, such as polarization sensitivity, limited dynamic range, electronic symmetry requirement, frequency stability requirement, splitter ratio inequality, large optical power difference, laser phase instability, signal fading, strict modulation depth requirement, high computation complexity, among others, therefore offers better stability and sensitivity. Also, since its interferometric optics is totally passive (does not require active phase control or carrier modulation), it is more compact, low cost, and stable. Therefore, by using this phase demodulator, the DAS and other fiber optic sensors can achieve better sensing performance with lower cost and real-time operation.

To sum up, the description of the above-mentioned preferred embodiments is for providing a better understanding on the strengths and spirits of this present invention, not for limiting the domain of the invention. Moreover, it aims to include various modification and arrangement parallel in form into the domain of the patent applied by this present invention. Due to the above mentioned, the domain of the patent applied by the invention should be explained in a macro view to cover all kinds of possible modification and arrangement of equal form.

What is claimed is:

1. A sensing system adapted to receive backscattered signal from a sensing fiber, comprising:
   a first Faraday rotator mirror;
   a second Faraday rotator mirror;
   an optical hybrid coupled to the Faraday rotator mirrors, wherein one of the mirrors is coupled with an optical path difference;
   a 3-port optical circulator coupled to the sensing fiber and the optical hybrid;
   a first photodetector coupled to the circulator; and
   second, third, and fourth photodetectors coupled to the optical hybrid.

2. The system of claim 1, comprising a fiber loop to provide the optical path difference.

3. The system of claim 1, comprising three optical attenuators respectively coupled to each of the three photodetectors.

4. The system of claim 1, comprising data converters coupled to each photodetectors.

5. The system of claim 1, wherein the photodetectors generates $I_1=A+B \cos[\phi(t)]$, $I_2=A+B \sin[\phi(t)]$, $I_3=A-B \cos[\phi(t)]$, and $I_4=A-B \sin[\phi(t)]$, respectively, where A and B are constants and $\phi(t)$ is a phase difference between two interfered sections at time t, comprising a processor obtain the time-varying phase information $\phi(t)$ from the four photodetector outputs, and $I_{1-4}$ comprise an intensity of detected light generated by the respective photodetectors.

6. A sensing system adapted to receive backscattered signal from a sensing fiber, comprising:
   a first Faraday rotator mirror;
   a second Faraday rotator mirror;
   an optical hybrid coupled to the Faraday rotator mirrors, wherein one of the mirrors is coupled with an optical path difference;
   an optical isolator coupled to the sensing fiber;
   a coupler receiving signals from the optical isolator and the optical hybrid;
   a first photodetector coupled to the coupler; and
   a second, third, and fourth photodetectors coupled to the optical hybrid.

7. The system of claim 6, wherein the coupler comprises a 2×1 coupler or a 2×2 coupler with one port unused.

8. The system of claim 6, comprising a fiber loop to provide the optical path difference.

9. The system of claim 6, comprising three optical attenuators respectively coupled to each of the three photodetectors.

10. The system of claim 6, comprising data converters coupled to each photodetectors.

11. The system of claim 6, wherein the photodetectors generates $I_1=A+B \cos[\phi(t)]$, $I_2=A+B \sin[\phi(t)]$, $I_3=A-B \cos[\phi(t)]$, and $I_4=A-B \sin[\phi(t)]$, respectively, where A and B are constants and $\phi(t)$ is a phase difference between two interfered sections at time t, comprising a processor obtain the time-varying phase information $\phi(t)$ from the four photodetector outputs, and $I_{1-4}$ comprise an intensity of detected light generated by the respective photodetectors.

12. A distributed acoustic sensor (DAS) system to receive backscattered signal from a sensing fiber, comprising:
   a laser;
   a modulator coupled to the laser;
   an optical amplifier and filter coupled to the modulator;
   a backscattered optical amplifier and backscattered filter coupled to the modulator;
   a circulator coupled to the filter and backscattered optical amplifier and the sensing fiber; and
   a delayed hybrid phase demodulator coupled to the backscattered filter; and
   a processor coupled to the delayed hybrid phase demodulator to sense acoustic signals.

13. The system of claim 12, wherein the delayed hybrid phase demodulator further comprises:
   a first Faraday rotator mirror;
   a second Faraday rotator mirror;
   an optical hybrid coupled to the Faraday rotator mirrors, wherein one of the mirrors is coupled with an optical path difference;
   a 3-port optical circulator coupled to the sensing fiber and the optical hybrid;
   a first photodetector coupled to the circulator; and
   second, third, and fourth photodetectors coupled to the optical hybrid.

14. The system of claim 12, wherein the delayed hybrid phase demodulator further comprises:
   a first Faraday rotator mirror;
   a second Faraday rotator mirror;
   an optical hybrid coupled to the Faraday rotator mirrors, wherein one of the mirrors is coupled with an optical path difference;
   a 3-port optical circulator coupled to the sensing fiber and the optical hybrid;
   a first photodetector coupled to the circulator; and
   second, third, and fourth photodetectors coupled to the optical hybrid.

15. The system of claim 14, comprising a fiber loop to provide the optical path difference.

16. The system of claim 14, comprising three optical attenuators respectively coupled to each of the three photodetectors.

17. The system of claim 14, comprising data converters coupled to each photodetectors.

18. The system of claim 14, wherein the photodetectors generates $I_1=A+B \cos[\phi(t)]$, $I_2=A+B \sin[\phi(t)]$, $I_3=A-B \cos[\phi(t)]$, and $I_4=A-B \sin[\phi(t)]$, respectively, where A and B are constants and $\phi(t)$ is a phase difference between two interfered sections at time t, comprising a processor obtain the time-varying phase information $\phi(t)$ from the four photodetector outputs, and $I_{1-4}$ comprise an intensity of detected light generated by the respective photodetectors.

19. The system of claim 14, comprising a data converter coupled to a processor receiving digitized photodetector output and driving a modulator driver.

20. The system of claim 14, wherein the modulator comprises an Acousto-Optic Modulator (AOM), comprising an AOM driver coupled to the AOM.

* * * * *